Jan. 19, 1937.　　　　T. D. RADER　　　　2,068,073
BRAKE
Filed Nov. 13, 1934

Inventor
Thomas D. Rader
By Lyon & Lyon
Attorneys

Patented Jan. 19, 1937

2,068,073

UNITED STATES PATENT OFFICE 2,068,073

BRAKE

Thomas D. Rader, Pasadena, Calif., assignor, by mesne assignments, of one-half to Richard Macintosh, Los Angeles, Calif.

Application November 13, 1934, Serial No. 752,823

5 Claims. (Cl. 188—78)

This invention relates to brakes, and while the invention is capable of being used in many different situations, in the present specification it is described as applied to an automobile wheel. Automobile brakes, when constructed of the "inside" type, usually involve the use of two oppositely disposed brake shoes that are pivotally mounted on the dust-plate on pivot points located near each other, and the brake shoes are expanded or forced outwardly by means of a pivoted double cam. That type of brake has the disadvantage that most of the pressure exerted by the brake shoe against the drum, is concentrated toward the free end or swinging end of the shoe. Furthermore, there is also a tendency in that kind of brake for one of the brake shoes to become locked. This, of course, is very dangerous, and is the cause of many accidents.

One of the objects of this invention is to produce a brake of simple construction, in which the shoes will be forced against the drum in such a way that they will exert a substantially uniform pressure throughout their length.

A further object of the invention is to provide a brake construction which will never lock either of the shoes when the brakes are applied.

The relining of brake shoes as ordinarily constructed, is a tedious and expensive operation, and necessitates the applying of rivets throughout the length of the shoe for holding the brake lining in place.

One of the objects of this invention is to provide a brake construction having shoes which carry demountable linings; also to construct the brake shoes and their actuating means in such a way as to leave the ends of the brake shoes free and unobstructed, to facilitate the removal of worn brake linings and to facilitate their replacement with new linings, avoiding the necessity for applying any rivets on the face of the brake shoe.

In its preferred construction, the brake involves the use of an actuator located between two diametrically opposite brake shoes, and one of the objects of the invention is to mount the actuator in such a way that when the braking force is applied, it will be balanced or equalized between the two shoes.

Further objects of the invention will appear hereinafter.

The invention consists in the novel parts and combination of parts to be described hereinafter, all of which contribute to produce an efficient brake.

Figure 1:
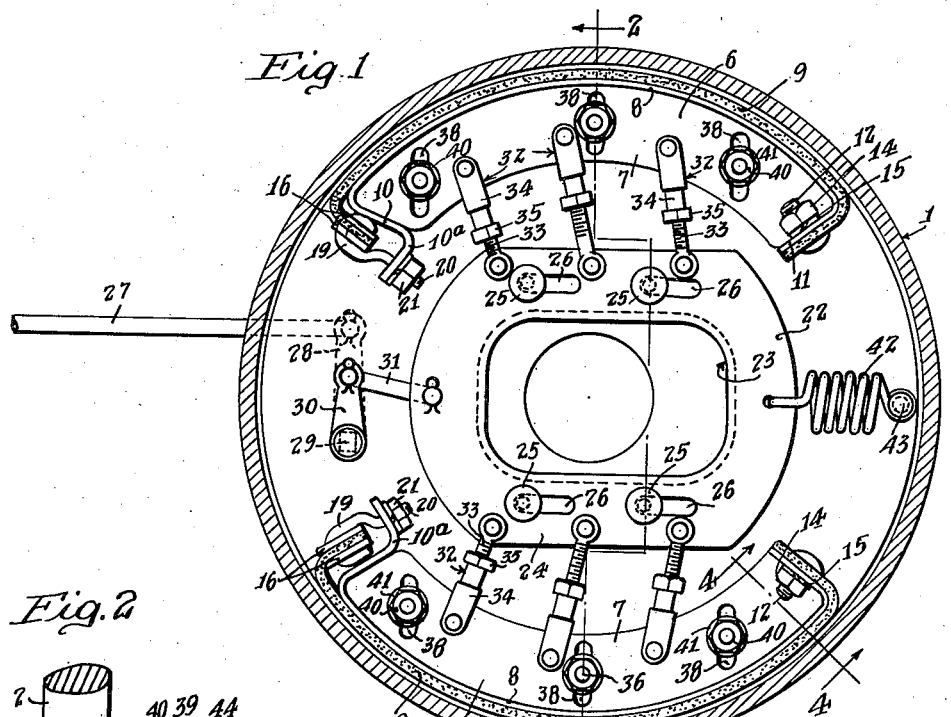
Figure 1 is a vertical section through a brake drum and illustrating my brake mechanism with the actuating rod for the brakes broken away.

Referring more particularly to the parts, 1 indicates an automobile brake drum which may be part of, or attached to, a wheel 2. In the present instance, the wheel illustrated is supposed to be a rear wheel attached to an axle 3 mounted in an axle housing 4, to which a dust-plate 5 is rigidly secured. The dust-plate 5 is, of course, a relatively fixed frame member of the car.

In applying my invention to such a brake drum, I provide two oppositely disposed brake shoes 6, and these brake shoes are preferably identical in construction. They are preferably of arcuate form such as shown, to enable them to conform to the curvature of the inner face of the brake drum 1. Each shoe 6 is preferably formed with a relatively deep central web 7, and has oppositely disposed flanges 8, which form a rim for the shoe to which the brake lining 9 is applied. The brake lining is preferably secured to each shoe so that it can be readily detached from it. For this purpose I prefer to provide the ends of each brake shoe with end flanges 10 and 11, which are preferably formed by bending the flanges 8 in a general radial direction, and inwardly toward the center of the wheel.

Figure 4:
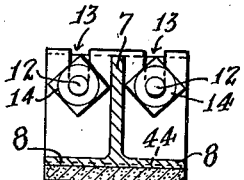
Figure 4 is a cross section taken on the line 4—4 of Fig. 1, to illustrate the anchorage for the opposite end of the brake lining.

Any suitable means may be employed for detachably securing the ends of the brake lining. In order to accomplish this, I prefer to provide one end of the lining with a pair of bolts 12 (see Fig. 4), which may be shoved into slots 13 extending outwardly in the end flanges 11 of the brake shoes. These bolts are provided with nuts 14 respectively, for tightening them up, and under the nuts I prefer to employ spring washers 15. The other end of each brake lining is preferably provided with a pair of anchor plates 16, which are secured on opposite sides of the end of the lining by suitable rivets 17, and these plates 16 have a central opening 18, which can be applied to a hook bolt 19 located at the adjacent end of the shoe, and this hook bolt is secured in a tongue 10ª, which constitutes an extension of the substantially radial end flange 10. The hook bolt 19 has a threaded shank 20 to pass through the tongue 10a and receive a nut 21 for tightening it up.

Figure 2:
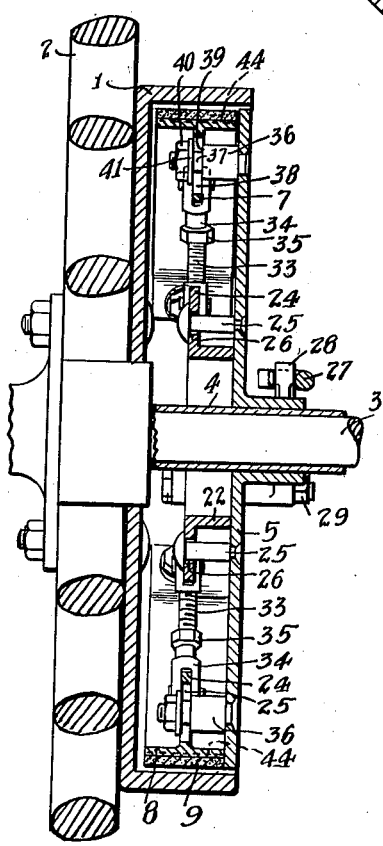
Figure 2 is a vertical section taken on the line 2—2 of Figure 1, and also illustrating parts of the wheel and axle broken away.
Figure 3:
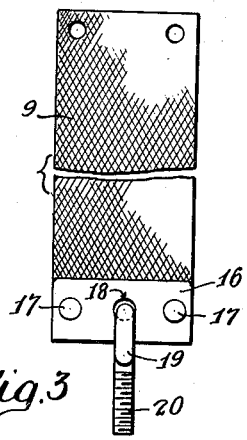
Figure 3 is a developed plan of one of the brake linings removed from the brake, with its middle portion broken away. This view also shows an anchoring hook applied to the end of the brake lining.

In order to enable the brake lining to be detachable in this manner, it is necessary to employ means for actuating the brake shoes, which will leave their ends unobstructed. For this purpose I prefer to employ an actuator 22, which is preferably in the form of a substantially rectangular plate, the middle portion of which has a large opening 23 to enable the axle and axle housing 4 to pass through the same. Means is provided for guiding this actuator to slide to and fro on a diametrical line through the drum located midway between the two brake shoes 6. In the present instance, the brake shoes are located adjacent to the upper and lower sides of the drum, so that in the present instance, the direction of travel of the actuator 22 is horizontal. The actuator 22 is preferably of angular cross section, as illustrated in Fig. 2, so that it presents an outwardly projecting flange 24. The flange 24 is supported on a plurality of posts 25 in the form of stout pins that project inwardly from the dust-plate 5, and these posts or pins pass through horizontal slots 26 in the flanges 24, so as to guide the actuator plate 22 when it moves to and fro.

The slots 26 are slightly larger than the pins 25, so as to permit a slight lateral play in the actuator for a purpose which will appear hereinafter.

In applying the brake, tension exerted in the brake rod 27 actuates a lever 28 pivotally mounted on the outer side of the dust-plate, and this lever, through a rock shaft 29, operates an inner lever or arm 30 that is connected by a link 31 with the forward end of the actuator 22. By this means the actuator 22 can be pulled forwardly, and when it moves in this direction, force is applied to the brake shoes through a plurality of inclined thrust links 32, which incline in a forward direction toward their outer ends. The ends of these links are respectively, pivoted on the shoes and on the actuator, and these links are also preferably constructed so that they are adjustable. For this purpose each link preferably comprises a threaded stem 33 that is received in a threaded sleeve 34, and may carry a lock nut 35.

The dust-plate is provided with means for guiding the shoes 6 so that they will slide outwardly when the braking force is applied to them through the thrust links. For guiding the brake shoes outwardly, I prefer to provide the dust-plate with a plurality of guide posts 36, which have reduced necks 37 at their inner ends, which are received by parallel slots 38 formed in the brake shoe. These slots extend substantially at right angles to the direction of travel of the actuator 22. By reason of the reduced diameter of the necks 37, the outer ends of the posts form guide shoulders 39 for supporting and guiding the webs 7 of the shoes. The brake shoes are secured to the posts 36 by suitable nuts 40, which may be applied over suitable washers 41, (see Fig. 2).

After the brakes have been applied, they will be released by a spring associated in some way with the mechanism. If desired, such return spring may be associated with the brake rod 27, but I prefer to employ a coil spring 42 located within the drum, attached at one end to an anchor pin 43 on the dust-plate, and attached at its other end to the adjacent end of the actuator, (see Fig. 1).

By reason of the fact that the pins 25 and the slots 26 permit lateral play in the actuator, it will be evident that the thrust force developed in one set of links at one side of the actuator, will be imparted through the actuator plate to the opposite set of links. This balances and equalizes the pressure of the brakes against the drum, and also enables the pins 25 to be made relatively light, as their only work is to guide the actuator plate 22 until the braking force is applied.

It will be evident that a brake mechanism constructed as described, will operate to apply the braking force with substantial uniformity throughout the area of the brake shoe, and furthermore, by reason of the fact that the brake shoes are positively guided in a general radial direction against the brake drum, there is no possibility for either of the of the shoes to become locked.

It will also be evident that when the brake linings have become worn, they can be quickly removed and new linings replaced, thereby resulting in great saving in time consumed in relining the brakes.

In order to prevent the tension developed in the brake linings from becoming concentrated at the anchorage at the ends of the brake shoes, I prefer to provide the outer face of each brake shoe with transverse grooves and ribs indicated by the dotted line 44 in Fig. 2.

It is understood that the embodiment of the invention described herein is only one of the many embodiments this invention may take, and I do not wish to be limited in the practice of the invention, nor in the claims, to the particular embodiment set forth.

What I claim is:—

1. In a brake, the combination of a relatively fixed frame member, a drum mounted for rotation relative to the frame member, a pair of diametrically oppositely disposed brake shoes on the interior of the said drum, means for guiding the brake shoes on the frame member to move outwardly toward the drum, an actuator, means for guiding the same on the fixed member to slide along a diametrical line of the drum located between the said brake shoes, means connected with the actuator for moving the same forward to press the brake shoes outwardly, and a plurality of inclined thrust links pivotally connected with the actuator and pivotally connected with the shoes with the longitudinal axes of the links inclined with respect to the direction of sliding movement of the actuator, said guiding means constructed so as to permit lateral play of the actuator so that the thrust imparted from each brake shoe through its inclined thrust links, will be imparted through the actuator to the inclined links on the opposite side of the actuator, thereby balancing and equalizing the pressure of the shoes against the drum.

2. In a brake, the combination of a relatively fixed frame member, a drum mounted for rotation relative to the frame member, a pair of diametrically oppositely disposed brake shoes on the interior of the said drum, means for guiding the brake shoes on the frame member to move outwardly toward the drum, an actuator, means for guiding the same on the fixed member to slide along a diametrical line of the drum located between the said brake shoes, means connected with the actuator for moving the same forward to press the brake shoes outwardly, and a plurality of inclined thrust links pivotally connected with the actuator and pivotally connected with the shoes with the longitudinal axes of the links inclined with respect to the direction of sliding movement of the actuator, said guiding means constructed so as to permit lateral play of the actuator so that the thrust imparted from each brake shoe through its inclined thrust links, will be imparted through the actuator to the inclined links on the opposite side of the actuator, thereby balancing and equalizing the pressure of the shoes against the drum, and a spring for normally holding the actuator in a position to maintain the shoes in a released position.

3. In a brake, the combination of a relatively fixed frame member, a drum mounted for rotation relative to the frame member, a pair of diametrically oppositely disposed brake shoes on the interior of the said drum, guide bolts and guide slots located intermediately on the brake shoes for positively guiding the brake shoes on the frame member to move outwardly toward the drum, an actuator, means for guiding the same on the fixed member to slide along a diametrical line of the drum located between the said brake shoes, means connected with the actuator for moving the same forward to press the brake shoes outwardly, and at least three inclined thrust links pivotally connected with the actuator on each side, and pivotally connected with the shoes at separated points with the longitudinal axes of the links inclined with respect to the direction of sliding movement of the actuator, and means for adjusting said links to enable the thrust forces to be imparted adjacent the middle and toward the ends of the brake-shoes.

4. In a brake, the combination of a relatively fixed frame member, a drum mounted for rotation relative to the frame member, a pair of diametrically oppositely disposed brake shoes on the interior of the said drum, guide bolts and guide slots for positively guiding the brake shoes on the frame member to move outwardly toward the drum, an actuator, guiding means for guiding the same on the fixed member to slide along a diametrical line of the drum located between the said brake shoes, means connected with the actuator for moving the same forward to press the brake shoes outwardly, and at least three adjustable inclined thrust links pivotally connected with the actuator at each side, and pivotally connected with the shoes at separated points on the brake-shoe with the longitudinal axes of the links inclined with respect to the direction of sliding movement of the actuator, said guiding means constructed so as to permit lateral play of the actuator so that the thrust imparted from each brake shoe through its inclined thrust links, will be imparted through the actuator to the inclined links on the opposite side of the actuator, thereby balancing and equalizing the pressure of the shoes against the drum.

5. In a brake, the combination of a relatively fixed frame member, a drum mounted for rotation relative to the frame member, a pair of diametrically oppositely disposed brake shoes on the interior of the said drum, means for positively guiding the brake shoes on the frame member to move outwardly toward the drum, an actuator, means for guiding the same on the fixed member to slide along a diametrical line of the drum located between the said brake shoes, means connected with the actuator for moving the same forward to press the brake shoes outwardly, and a plurality of inclined thrust links pivotally connected with the actuator and pivotally connected with the shoes with the longitudinal axes of the links inclined with respect to the direction of sliding movement of the actuator, said latter guiding means constructed so as to permit lateral play of the actuator so that the thrust imparted from each brake shoe through its inclined thrust links, will be imparted through the actuator to the inclined links on the opposite side of the actuator, thereby balancing and equalizing the pressure of the shoes against the drum, and a spring for normally holding the actuator in a position to maintain the shoes in a released position, said positive guiding means operating to prevent either brake-shoe being moved out of its guided line of movement by the friction drag on the same, and thereby preventing locking of the brakes.

THOMAS D. RADER.